US008756703B2

(12) United States Patent
Kovacs et al.

(10) Patent No.: US 8,756,703 B2
(45) Date of Patent: Jun. 17, 2014

(54) METHOD AND COMMUNICATION DEVICE FOR PROTECTING A USER'S PRIVACY

(75) Inventors: Ernoe Kovacs, Stuttgart (DE); Miguel Martin Lopez, Ludwigshafen (DE); Martin Bauer, Eppelheim (DE)

(73) Assignee: NEC Europe Ltd., Heidelberg (DE)

( * ) Notice: Subject to any disclaimer, the term of this patent is extended or adjusted under 35 U.S.C. 154(b) by 423 days.

(21) Appl. No.: 12/921,203

(22) PCT Filed: Mar. 5, 2008

(86) PCT No.: PCT/EP2008/001762
§ 371 (c)(1),
(2), (4) Date: Nov. 9, 2010

(87) PCT Pub. No.: WO2009/109201
PCT Pub. Date: Sep. 11, 2009

(65) Prior Publication Data
US 2011/0061106 A1   Mar. 10, 2011

(51) Int. Cl.
*G06F 21/24* (2006.01)
(52) U.S. Cl.
USPC ............... 726/27; 726/26; 705/74; 705/325; 707/757; 715/745
(58) Field of Classification Search
USPC .................. 726/26–28; 340/539.11, 539.13; 705/74, 325; 715/745; 707/757
See application file for complete search history.

(56) References Cited

U.S. PATENT DOCUMENTS

| 7,389,541 | B2 * | 6/2008 | Jia et al. ........................... 726/26 |
| 8,060,570 | B2 * | 11/2011 | Pousti et al. .................. 709/206 |
| 8,069,485 | B2 * | 11/2011 | Carter ............................. 726/26 |
| 8,224,907 | B2 * | 7/2012 | Cohen et al. .................. 709/206 |
| 8,238,905 | B2 * | 8/2012 | Jiang ........................... 455/432.1 |
| 2001/0037316 | A1 * | 11/2001 | Shiloh .............................. 705/74 |
| 2003/0188171 | A1 * | 10/2003 | DeCenzo et al. ............. 713/185 |
| 2004/0181683 | A1 * | 9/2004 | Jia et al. ........................ 713/200 |
| 2006/0238380 | A1 | 10/2006 | Kimchi et al. |
| 2007/0178909 | A1 | 8/2007 | Doyle |
| 2007/0264974 | A1 | 11/2007 | Frank et al. |
| 2009/0061860 | A1 * | 3/2009 | Jiang ............................. 455/433 |
| 2010/0198826 | A1 * | 8/2010 | Petersen et al. ............... 707/737 |

FOREIGN PATENT DOCUMENTS

| JP | 2006254294 A | 9/2006 |
| JP | 2007213267 A | 8/2007 |

OTHER PUBLICATIONS

"Episode Archive: Mr. Monk and the Marathon Man (#T-1106)" Synopsis of episode originally broadcast Sep. 13, 2002 (2 pages) http://www.usanetwork.com/series/monk/theshow/episodeguide/episodes/s1_marathon/index.html.*
International Search Report, dated Aug. 18, 2008, from corresponding PCT application.
Translation of Japanese Office Action, dated Feb. 14, 2012, from corresponding JP application.

* cited by examiner

*Primary Examiner* — Beemnet Dada
*Assistant Examiner* — Thomas Gyorfi
(74) *Attorney, Agent, or Firm* — Young & Thompson

(57) ABSTRACT

A method for protecting a user's privacy, wherein the user operates a communication device capable of processing context and wherein the user provides context information—real context—related to one or more reference context variables to a third party, is characterized in the steps of faking at least one of the one or more reference context variables, on the basis of the faked reference context variable, gathering real context information—decoy context—related to reference context variables other than the faked reference context variable, publishing the thus generated decoy context instead of the user's real context. In addition, a corresponding communication device is disclosed.

16 Claims, 1 Drawing Sheet

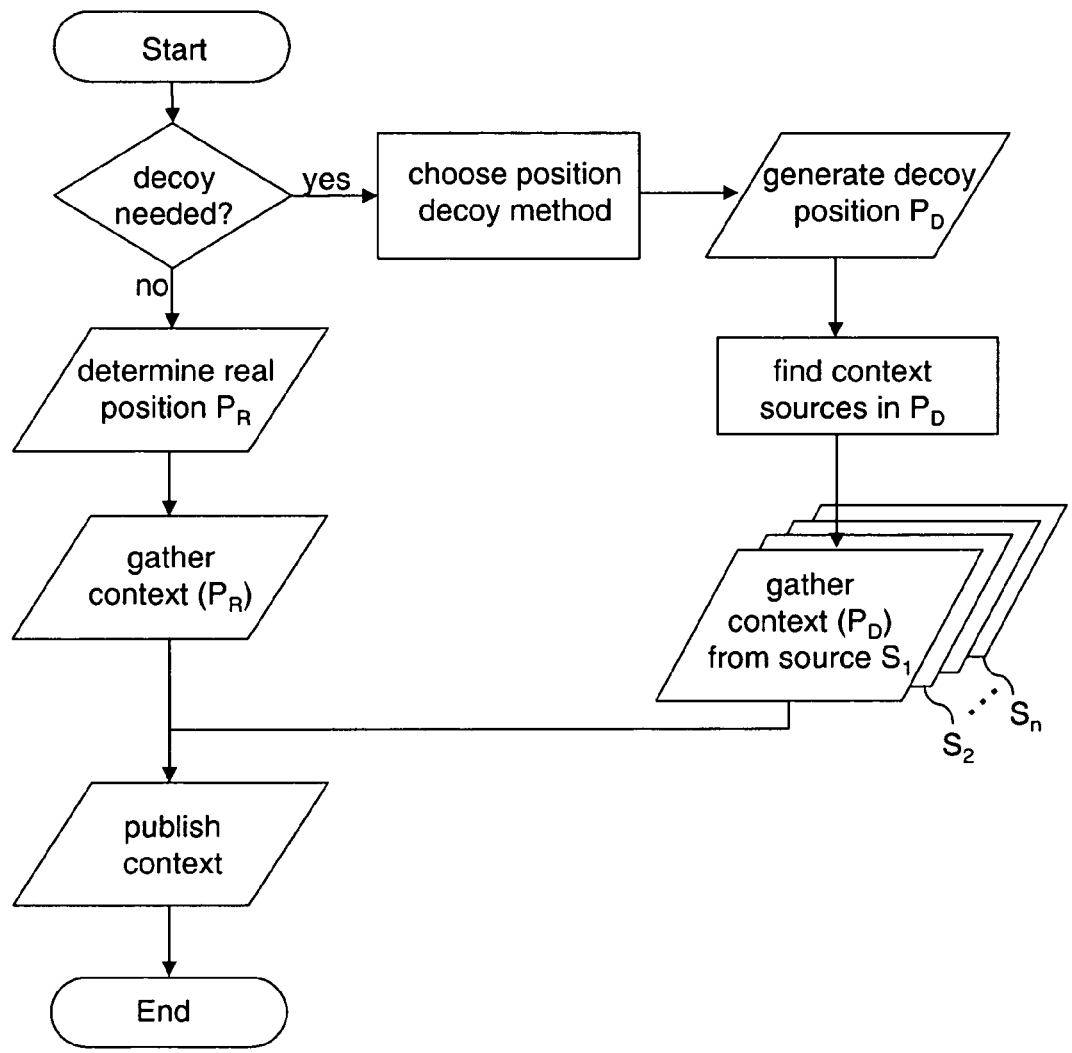

METHOD AND COMMUNICATION DEVICE FOR PROTECTING A USER'S PRIVACY

The present invention relates to a method for protecting a user's privacy, wherein the user operates a communication device capable of processing context and wherein the user provides context information—real context—related to one or more reference context variables to a third party.

Furthermore, the present invention relates to a communication device for protecting a user's privacy, the communication device comprising means for processing context and means for providing context information—real context—related to one or more reference context variables to a third party.

The advent of converged next generation communication networks (NGNs) leads to an ever increasing number of mobile services. Today NGNs enable users of network devices, like e.g. mobile terminals, to make use of a comprehensive service catalogue including, for example, infotainment applications like mobile TV, music downloads, e-news, games, etc. Furthermore, different types of communication are available, like SMS or VoIP (Voice over IP), to name just the most popular ones. Parallel to the deployment of these extensive types of services, a trend is to be observed in mobile applications to make them more aware of the user's context.

According to a definition given by A. K. Dey in "*Understanding and Using Context*", context is any information that can be used to characterize the situation of an entity. An entity is a person, place or object that is considered relevant to the interaction between a user and an application, including the user and application themselves. Insofar, an important context source is the user himself (or the user equipment, respectively). Context may be regarded as small self-contained information units which have to be distinguished both from measurements and from content. Context can be classified in different categories as there is user context related to the user personalization, device context related to technical specifications and limitations of user equipment, environmental context related to location-based services, and group context related to knowledge sharing and completion. Context is thus extremely miscellaneous and reference context variables may include but are not limited to the geographical variables like user's position or place type, social variables like his belonging to a group, physiological variables like the user's heart beat rate, or various other variables like the user's moving speed, or the ambient air temperature.

Context-awareness of user equipment generally means sharing personal information with servers (as the case may be with untrusted ones) and other users. Therefore, in connection with context applications preserving the user's privacy is of paramount importance.

There are already a number of prior art mechanisms that address the problem of ensuring privacy in communication systems and substantial effort has been made towards the realization of these mechanisms in practice. Generally spoken, existing privacy ensuring primitives can be divided into two broad categories which are the anonymization of information on the one hand and, on the other hand, controlling access to it in terms of who is granted access and how access is granted.

Anonymizing of information consists of tagging the published information to another, potentially fictional ID. By doing so, users can provide a broad range of information, including sensitive issues like adult habits or medical records. Virtual ID systems with varying degrees of complexity have been deployed. The artifice consists in providing an ID which, while looking completely random, can still be claimed when required for reputation building, authentication of transactions, etc.

Access control includes white, gray and black lists that determine whether information X can be handed over to service Y (white), whether the user should be asked (gray), or whether service Y is barred from accessing it (black). For instance, proposals of the Liberty Alliance Project employ such mechanisms and allow for secure, fine grained control of what information is handed out to whom.

Yet another alternative of denying access to information is the dilution of precision with which information is made available to third parties, otherwise known as blurring. When e.g. position information is required, the user can choose to provide his exact position, to introduce an error of some 100 meters to his actual position, to provide only the city where he is currently staying, etc. Many services will be satisfied with the blurred data, and can function perfectly with it.

It is to be noted that all above mentioned mechanisms either keep the user's identity secret, or deliberately hide information from a requesting party. It is also to be noted that if information has been provided once, a reason might be needed to suddenly quit making it available. Furthermore, certain applications require the true identity of a user, or at least a consistent, trackable ID (e.g. a family watch application that alerts the father if the mother could not go pick up the kids at school). When identity is revealed, one must resort to either denying access or blurring the information. However, blurred information can often be spotted as faked.

Notwithstanding the disadvantages of the mechanisms as described above, they would satisfy many interactions between user applications and servers. However, they are usually not sophisticated enough to fool human communication. Apparently, in a situation in which a user constantly provides e.g. his position to another party, for example to his wife, the fact that he suddenly blurs this information or denies it altogether implies that he is trying to hide something, what might require awkward explanations later. This clearly is an obstruction for the dissemination and acceptance of many context-aware applications. Other examples of services where this problem arises are, for instance, family applications (where's each family member?), health-care applications (e.g. monitoring of heart-beat and other vitals), or context-rich presence applications (position/mood/etc. . . . become part of user's presence information in an Instant Messaging Program). Insofar, currently existing privacy protection mechanisms are not suitable for most human to human interactions.

A possible solution to covertly concealing information would be lying about particular pieces of it. For instance, users can set their status to "Away" or "Invisible" on instant messaging applications to avoid being disturbed, or keep an "Out of the office" e-mail auto-responder to gain time. However, these methods do not provide an integral solution in a context-rich environment, because the faked information is not consistent with the rest of information surrounding the user.

Another important problem area is in the field of Identity Management, where a user owns multiple identities and shows them as needed to each of the parties he interacts with (e.g. Father, Worker, Driver, Anonymous, etc.). Because Identities represent a person, it is possible to obtain context information related to each of them. By matching the context of each ID, one could infer that two or more IDs actually belong to the same person.

It is an objective of the present invention to improve and further develop a method and a communication device of the initially described type for protecting a user's privacy in such a way that, by employing mechanisms that are readily to implement, an improvement in terms of a higher effectiveness of privacy protection is achieved.

In accordance with the invention, the aforementioned object is accomplished by a method comprising the features of claim 1. According to this claim, such a method is characterized in the steps of faking at least one of said one or more reference context variables, on the basis of said faked reference context variable, gathering real context information—decoy context—related to reference context variables other than said faked reference context variable, and publishing the thus generated decoy context instead of the user's real context.

The problem mentioned above is furthermore solved by a communication device for protecting a user's privacy according to claim 17. According to this claim, such communication device is characterized in that it comprises a selection means for selecting at least one of said one or more reference context variables, a forgery unit for faking said at least one selected reference context variable, a collector which takes said faked reference context variable as basis for gathering real context information—decoy context—related to reference context variables other than said faked reference context variable, and a publishing means for making the thus generated decoy context available to third parties instead of the user's real context.

According to the invention it has first been recognized that currently existing privacy protection mechanisms are not suitable for most human to human interactions and that the reason for this is because such mechanisms do not hide the fact itself that information is being hidden. Moreover, it has been recognized that, in order to enhance the user acceptance of privacy securing mechanisms, the user should be given a possibility to "switch off" the flow of information in a way that entails no consequences. To this end the invention proposes to enable the user to fake at least one reference context variable which, in the communication device according to the invention, is performed by means of a forgery unit. The faked reference context variable is then taken as basis for gathering context information related to other reference context variables. Hence, the faked information is consistent with the rest of information surrounding the user and changes dynamically with the real world context changes. In the following, the faked reference context variable is referred to as "decoy variable" and the whole set of context gathered in conformance with the decoy variable is referred to as "decoy context". By publishing the decoy context instead of the user's real context, the user's privacy is efficiently protected as, for a third party receiving the context, it is impossible to distinguish between received decoy context and real context. The published decoy context appears as the user's real context. Thus, according to the invention it is possible to hide private context information without revealing the fact of hiding it, thereby removing an essential obstacle for the deployment of context aware technologies, for example in Identity Management scenarios or IPTV scenarios.

According to a preferred embodiment, the faked reference context variable, i.e. the decoy variable, may include but is not limited to the user's position, the user's belonging to a group, the user's speed, the type of the user's where-abouts, and/or the user's heartbeat rate. Various other variables can be envisioned, however, the reference context variable "user's position" is considered to be the most beneficial one as will be explained in more detail below.

As regards an enhancement of protection, exchanging the faked reference context variable from time to time may be provided. By this means an additional obfuscation is introduced which increases the difficulty for third parties to infer the user' real situation. In this connection it proves to be advantageous to change the faked reference context variable dynamically in order to fully adapt to the user's respective current situation.

Advantageously, the decoy context is generated by using various available context sources. Available context sources may include sensors in the environment like e.g. publicly available sensor boxes and/or sensor networks. Such sensor networks are ideal candidates for the provision of environmental data like whether conditions (temperature, air pressure, humidity, etc.).

In addition or alternatively, third party services may be employed as context sources for gathering decoy context. Such services might include a context database which is managed and updated by any stakeholder, notably a network operator. Context may be also gathered by using inferred information, thereby producing a believable replacement of the user's real context. Moreover, it may be provided that the decoy context is gathered by employing anonymously provided user context. In this case users would effectively behave as sensors. A suitable reward scheme could be implemented to offer an incentive for users to share their context.

According to a preferred embodiment, the user's position is chosen as decoy variable wherein the decoy position is generated by freezing the user's current position. This would allow the user to go elsewhere, while still pretending to be still in the same place. In this connection it is to be noted that a static position does not mean a static context since, for instance, temperature, nearby people, noise levels, etc. would constantly change.

Another option, when the user's position is chosen as decoy variable, to generate the decoy position is the employment of a pre-recorded track. For example, it may be provided that the user chooses the yesterday's "go to the office, work, lunch, work, go home" position track. Even if the same position, at the same time of date, is used as decoy position, the context is likely to change. By obtaining the decoy context from the current moment and from real sensors/users or other sources, a believable decoy context is produced.

Alternatively, when the user's position is chosen as decoy variable, the decoy position may be generated by plotting a route and pretending to follow that route. This means that the value of the reference variable "position" is the sequence of positions that a person walking on that route would follow. By plotting a route that takes longer than strictly necessary (i.e. a suboptimal, longer route) the user can gain some extra time. Consequently, when the user in reality chooses to take the optimal, shortest route, the user can do something else with the extra time he gets. For instance, one could pretend to go from home to work through a lot of little streets instead of taking the highway. If the home to work trip takes 30 minutes, but the faked route takes 50 minutes, the user has 20 minutes to do as he pleases, and then head for the office in the shortest route (30 min). To an observer, the user has simply taken a longer path.

According to another alternative, when the user's position is chosen as decoy variable, decoy context may be generated by borrowing it from another user, in particular from another anonymous user. In this case the user specifies his decoy positions, for instance by giving a certain route by employing one of the procedures as described above, and then needs to get context information for the positions along that route. To do this, the user may pick any user near that route and use his context information as if it was his own.

This case proves to be especially advantageous in cases in which a specific spot shall be avoided. More specifically, if a user does not want to reveal the fact that he is entering a certain geographical area, the user can be given the option to forbid that area. A forbidden area might be specified by issuing a centre of the area and a radius for defining the extension of that area around the specified centre. When the user enters the specified area his decoy context can be gathered from passers-by. It is to be noted that even the position may be borrowed from a passer-by.

Still another advantageous possibility to gather decoy context, when the user's position is chosen as decoy variable, is tagging another user and employing the current position of that other user (and, in addition, the other user's context).

Advantageously, a template or another selection means with regard to context publishing is provided which allows the user to choose whether, for each of his reference context variables, the real context or the decoy context will be published. By this means, the user has given full flexibility as what concerns adaptation of his behaviour to his current situation. In addition or alternatively, a selection mechanism may be provided which allows the user to choose to which party the real context is made available and to which party the decoy context is made available. By this means, the user is given some degree of control and allowance is made for the fact that the user might wish to protect his privacy with regard to certain people exclusively, whereas other people, e.g. family members or friends, shall be kept informed about his real situation.

In a preferred embodiment, the user possesses different identities and is given the option to publish different decoy context for different user identities. This aspect proves to be useful in the field of identity management, where a user owns multiple identities and shows them as needed to each of the parties he interacts with. For example, it is possible that a user acting under his identity "employee" publishes another decoy context than under his ID "father".

There are several ways how to design and further develop the teaching of the present invention in an advantageous way. To this end, it is to be referred to the patent claims subordinate to patent claims 1 and 17 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings the only FIGURE illustrates a process flow chart for decoy context generation according to one embodiment of the present invention.

The only FIGURE illustrates a process flow charge for decoy context generation according to an embodiment of the present invention. In the specific case shown the reference context variable "user's position" is employed as decoy variable.

After starting the process flow, the user has the option to choose whether he wishes to fake context or, e.g. because no privacy concerns currently exist, whether his real situation shall be made available to third parties. If the user decides to choose the latter option, he will be following the vertical flow path and, in a first step, he will determine his real position labelled $P_R$.

In a next step, the user gathers context related to his real position $P_R$ or, to put it in other words, the user's real position $P_R$ is taken as a basis for context gathering. The context gathered in that way is made available to third parties which is the usual proceeding as generally employed in connection with context aware applications.

If, however, the user feels that his privacy is concerned and he therefore wants his real context not to be published, he may decide to hide his real context and to make decoy context available to third parties. In a first step, the user is enabled to choose a specific position decoy method. There are various possibilities for this choice, like for example freezing his current position, using a pre-recorded track, keeping a certain distance from the real position, plotting a route and pretending he is following it, etc. It may be provided that the user is given the option to decide which of these methods are implemented on his communication device for being instantiated and run.

After having decided on a position decoy method, the user generates his decoy position, labelled $P_D$. In a next step, the user has to find context sources in $P_D$. This is an essential point in order to achieve consistency between the faked position and the respective context. Context sources may be publicly available sensor boxes, public sensor networks, context databases managed by network operators, other users acting as sensors and so on. The user retrieves context (related to decoy position $P_D$) from sources $S_1, \ldots, S_n$ he has discovered and publishes the thus generated context as his own (decoy) context. As the thus published context is real context (however, related to a faked position), it is impossible for third parties receiving that context to notice that it is not the user's real context but decoy context. Consequently, the user's privacy is strongly protected without making third parties aware of the fact that the user is hiding something.

Many modifications and other embodiments of the invention set forth herein will come to mind the one skilled in the art to which the invention pertains having the benefit of the teachings presented in the foregoing description and the associated drawing. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for protecting a user's privacy, wherein the user operates a communication device capable of processing context and wherein the user provides context information for reference context variables to a third party, the method comprising:
   faking the user's location by creating a decoy location that is generated by tracking a different user and employing a location of the different user as the user's location,
   gathering decoy context information for the reference context variables at the decoy location, wherein the decoy context information is real context information for the decoy location and changes dynamically therewith, and
   publishing the decoy context information instead of the user's real context information without hiding the user's identity.

2. Method according to claim 1, wherein said reference context variables include at least one of speed, type of location, and heart beat rate.

3. Method according to claim 1, wherein said decoy context information is generated by using available context sources.

4. Method according to claim 3, wherein said available context sources include sensors in the environment and/or sensor networks.

5. Method according to claim 3, wherein said available context sources include third party services.

6. Method according to claim 1, wherein said decoy context information is gathered by using inferred information and/or on the basis of anonymously provided user context.

7. Method according to claim 1, wherein the user is given the option to choose whether, for each of his reference context variables, the user's real context information or the decoy context information will be published.

8. Method according to claim 1, wherein the user is given the option to choose to which party the user's real context information is made available and to which party the decoy context information is made available.

9. Method according to claim 1, wherein the user possesses different identities and wherein different decoy context information is published for said different user identities.

10. Method according to claim 1, wherein the decoy context information is generated by borrowing the real context information from said different user.

11. Method according to claim 1, wherein said reference context variables include at least one of environmental data consisting of temperature, pressure, humidity, and noise levels.

12. Communication device for protecting a user's privacy, the communication device comprising:

means for processing context and means for providing context information related to reference context variables to a third party, a forgery unit for faking the user's location by creating a decoy location that is generated by tracking a different user and employing a location of the different user as the user's location a collector that gathers decoy context information for the reference context variables at the decoy location, wherein the decoy context information is real context information for the decoy location and changes dynamically therewith, and a publishing means for making the decoy context information available to third parties instead of the user's real context information without hiding the user's identity.

13. Communication device according to claim 12, wherein a selection mechanism is provided, allowing the user to choose whether, for each of his reference context variables, the user's real context information or the decoy context information will be published.

14. Communication device according to claim 12, wherein a selection mechanism is provided, allowing the user to choose to which party the user's real context information is made available and to which party the decoy context information is made available.

15. Communication device according to claim 12, wherein the decoy context information is generated by borrowing the real context information from said different user.

16. Communication device according to claim 12, wherein said reference context variables include at least one of environmental data consisting of temperature, pressure, humidity, and noise levels.

* * * * *